No. 874,852. PATENTED DEC. 24, 1907.
W. LORENZ.
DIFFERENTIAL GEARING.
APPLICATION FILED JUNE 17, 1907.

2 SHEETS—SHEET 1.

Witnesses:
Paul Hinkelmann.
Emil Kayser.

Inventor:
Wilhelm Lorenz
by Robert Doyler
Attorney

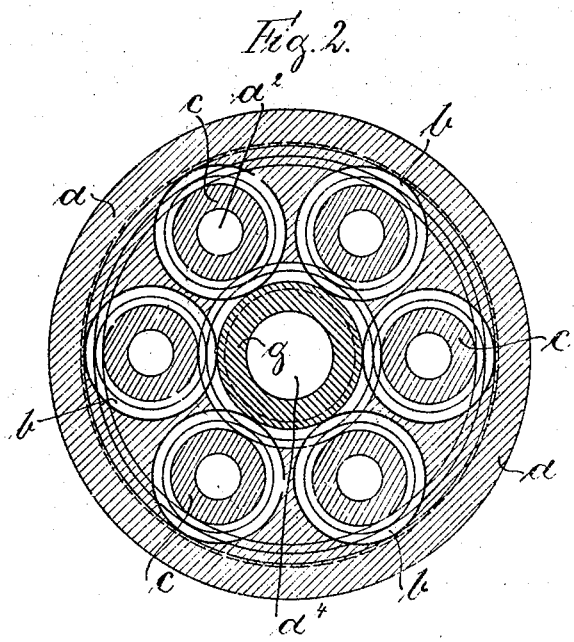
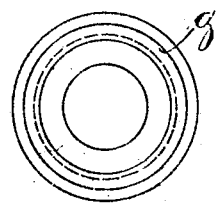
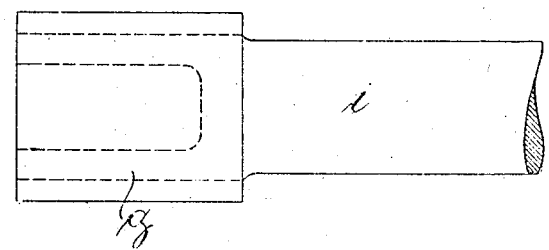

UNITED STATES PATENT OFFICE.

WILHELM LORENZ, OF KARLSRUHE, GERMANY, ASSIGNOR TO THE FIRM OF DAIMLER MOTORENGESELLSCHAFT, OF UNTERTURKHEIM-STUTTGART, GERMANY.

DIFFERENTIAL GEARING.

No. 874,852.  Specification of Letters Patent.  Patented Dec. 24, 1907.

Application filed June 17, 1907. Serial No. 379,392.

*To all whom it may concern:*

Be it known that I, WILHELM LORENZ, a subject of the Grand Duke of Baden, and resident of 55/61 Kriegstrasse, Karlsruhe, in the Grand Duchy of Baden, German Empire, have invented a new and Improved Differential Gearing, of which the following is an exact specification.

This invention relates to an improved differential gearing for driving automobiles and the like automatically operated vehicles. The differential gearing is of such type that the differential shafts are coaxially arranged and inclosed one by the other and the driving shaft is situated on the one side of the gear wheels, the so-called planet-wheels, serving for transmitting the movement of the latter to the differential shaft and the differential shafts being situated on the other side of such wheels.

It is the object of my invention to provide a simple, cheap and efficient construction which may be arranged at will at a convenient place of the vehicle and is constructed as to prevent the gearing from becoming dirtied and soiled.

With this object in view the invention consists in fitting the driving shaft with a cylindrical part receiving the planet wheels and the differential shaft with a second casing facing the cylindrical part and coöperating with it as to form a closed casing.

Figure 1:
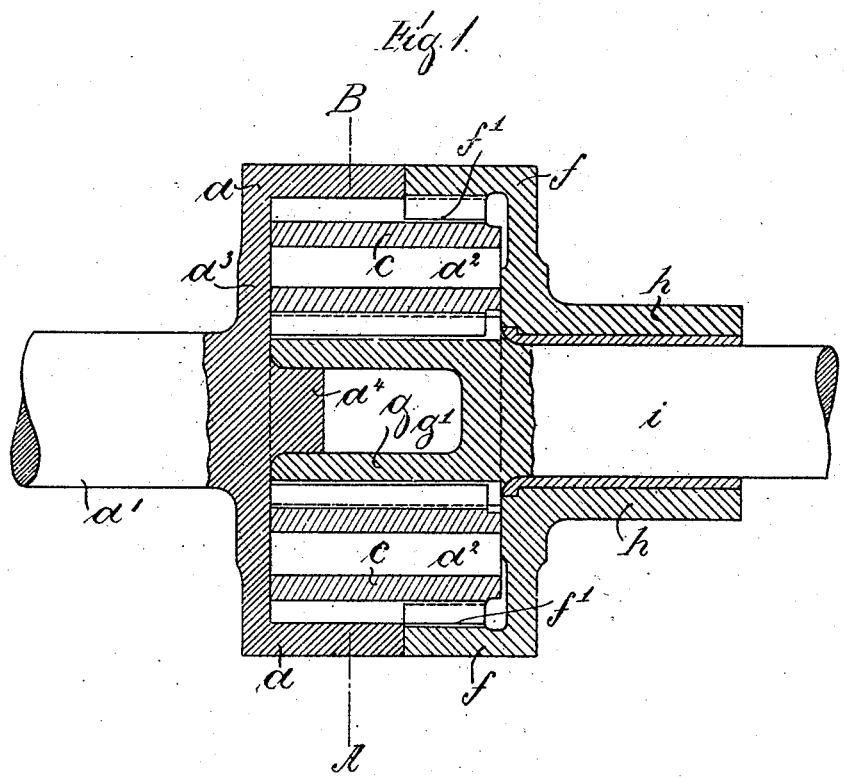
Figure 3:
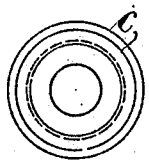
Figure 4:
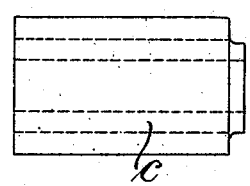

In order to make my invention clear, reference is had to the accompanying drawings, in which:

Figure 1 represents the improved differential gearing in a vertical longitudinal section, Fig. 2 is a cross section on line A—B of Fig. 1, Figs. 3 and 4 represent a front and side view of a planet-wheel serving for transmitting the motion of the driving shaft to the differential shafts. Figs. 5 and 6 are details in front and side-view respectively.

Referring to the figures $a'$ is the driving shaft which is provided with a cylindrical head or enlargement $a$. Within said head $a$ several cylindrical recesses are provided, in which projections or pivots $a^2$ are provided and made in this example integral with the wall $a^3$ of the casing $a$.

$a^4$ is a central projection of the driving shaft arranged in a central recess of the head $a$.

$c$ are planet-wheels loosely mounted on the pivots $a^2$ within said recesses.

$f$ is a casing provided with an internally toothed ring $f'$ and made integral with the hollow shaft $h$ forming the one differential shaft. $i$ is the second differential shaft inclosed by the hollow shaft $h$ and provided with a toothed head $g$, in the recess $g'$ of which the afore mentioned projection $a^4$ extends serving for centering and supporting the shaft $i$.

As will be seen from the figures the planet-wheels $c$ mesh on the one hand with the internally toothed ring $f'$ and on the other hand with the central toothed wheel $g$ but not one with the other. Both the parts $a$ and $f$ are facing as to form a closed casing surrounding and shutting off entirely the gear of the mechanism.

The operation of this differential gearing will be obvious from the foregoing statements. By the rotation of the shaft $a'$ and owing to the fact that the internally toothed rim $f$ engages with the toothed wheels $c$ and the latter are in engagement with the toothed wheel $g$ the hollow shaft $h$ and the central shaft $i$ are simultaneously turned round. This simultaneous rotation however is maintained only if the resistance opposed to the movement of both shafts $i$ and $h$ is the same. If for instance the resistance on the shaft $h$ is greater, the shaft $h$ is allowed to rotate more slowly owing to the fact that the toothed wheels $c$ are loosely arranged on the pivots $a^2$.

Having thus fully described the nature of my invention, what I desire to secure by Letters Patent of the United States is:—

1. A differential gearing comprising a driving shaft provided with a cylindrical part and a central differential shaft carrying a toothed wheel, coaxially arranged with the driving shaft, and a second differential shaft inclosing the central shaft, and provided with a casing having teeth, and planet wheels carried by the said cylindrical part and meshing with said teeth and the said central toothed wheel.

2. A differential gearing comprising a driving shaft provided with a cylindrical head made integral with the driving shaft, pivots carried in recesses by the driving shaft, a central differential shaft provided with teeth, a hollow shaft loosely mounted on said central shaft and provided with an internally toothed ring, planet wheels loosely carried by said pivots and meshing with the teeth of the central shaft and the internally toothed ring.

3. A differential gearing comprising a driving shaft provided with a cylindrical head carrying pivots, and a central pivot made integral with the said head, a central shaft having a toothed head (g), in which a recess is provided to serve as a bearing for said central pivot, a hollow shaft loosely mounted on the central shaft and provided with an internally toothed ring, planet-wheels loosely mounted on said pivots and meshing with the internally toothed ring and the toothed head of the central shaft.

In witness whereof I have hereunto set my hand in the presence of two witnesses.

WILHELM LORENZ.

Witnesses:
ROBERT UHLAND,
ERNEST ENTENMANN.